(12) United States Patent
Morimoto

(10) Patent No.: US 7,050,839 B2
(45) Date of Patent: May 23, 2006

(54) MOBILE COMMUNICATION TERMINAL INCLUDING AUTOMATIC FREQUENCY CONTROL FUNCTION

(75) Inventor: Masami Morimoto, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 379 days.

(21) Appl. No.: 10/386,422

(22) Filed: Mar. 13, 2003

(65) Prior Publication Data

US 2004/0176148 A1    Sep. 9, 2004

(30) Foreign Application Priority Data

Feb. 13, 2003    (JP)    ............... 2003-035564

(51) Int. Cl.
*H04B 1/707* (2006.01)

(52) U.S. Cl. ...................... 455/574; 455/313
(58) Field of Classification Search ................ 455/574, 455/313, 343.1, 343.2, 343.5
See application file for complete search history.

(56) References Cited

U.S. PATENT DOCUMENTS

| | | | |
|---|---|---|---|
| 6,333,939 B1* | 12/2001 | Butler et al. ................ 370/503 |
| 6,359,870 B1* | 3/2002 | Inoue et al. ................ 370/337 |
| 6,597,729 B1* | 7/2003 | Schmidl et al. ............. 375/149 |
| 2002/0101840 A1* | 8/2002 | Davidsson et al. |
| 2003/0043766 A1* | 3/2003 | McDonough et al. |
| 2003/0138030 A1* | 7/2003 | Gavnoudias et al. |
| 2004/0043746 A1* | 3/2004 | Hiramatsu |
| 2004/0091026 A1* | 5/2004 | Nakayama |
| 2004/0152438 A1* | 8/2004 | Yamauchi et al. |
| 2005/0078743 A1* | 4/2005 | Shohara |

FOREIGN PATENT DOCUMENTS

JP    2002-217776    8/2002

* cited by examiner

*Primary Examiner*—William J. Deane, Jr.
(74) *Attorney, Agent, or Firm*—Finnegan, Henderson, Farabow, Garrett & Dunner, L.L.P.

(57) ABSTRACT

A cell search is continuously performed with respect to an active base station and peripheral base station which are objects, when a path from the active base station cannot be detected as a result of path search in a wake-up period in a standby state. Subsequently, an error of a reception frequency is detected based on the path detected by the cell search, and the reception frequency of a receiver is corrected so as to decrease the detected frequency error.

8 Claims, 4 Drawing Sheets

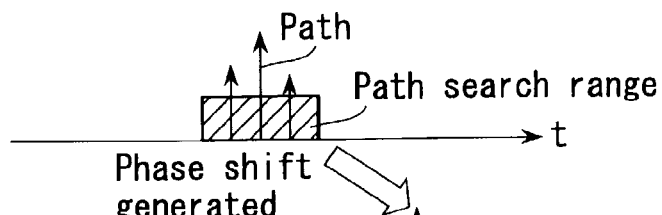
FIG. 4A
FIG. 4B
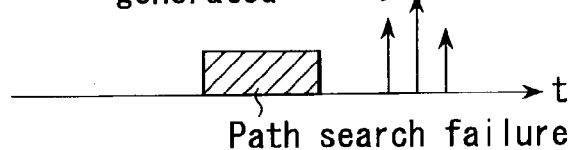
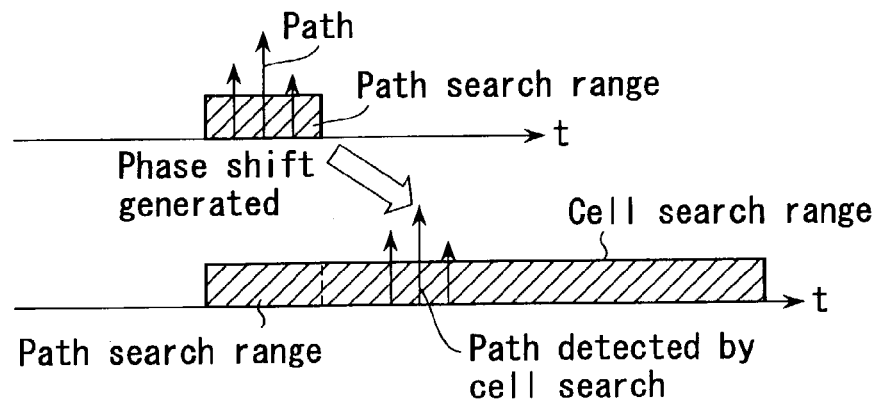
FIG. 5A
FIG. 5B
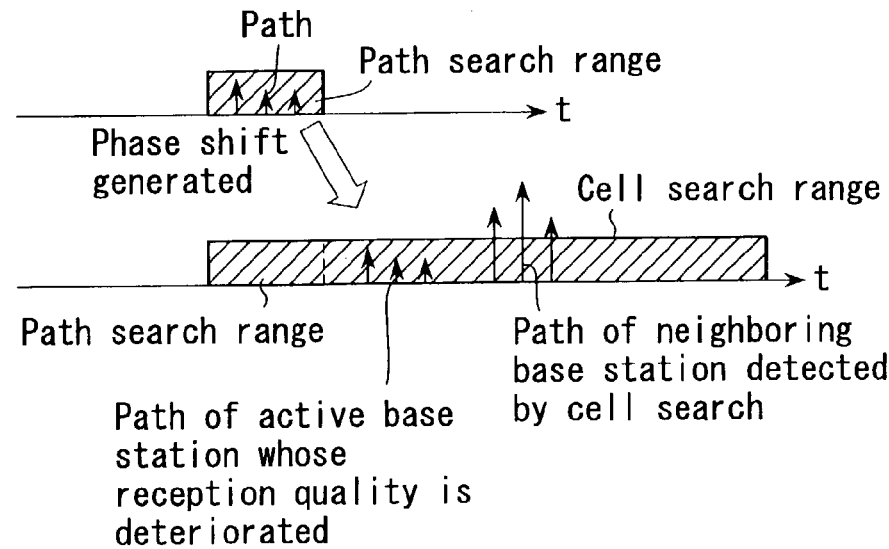
FIG. 6A
FIG. 6B

MOBILE COMMUNICATION TERMINAL INCLUDING AUTOMATIC FREQUENCY CONTROL FUNCTION

CROSS-REFERENCE TO RELATED APPLICATIONS

This application is based upon and claims the benefit of priority from the prior Japanese Patent Application No. 2003-035564, filed Feb. 13, 2003, the entire contents of which are incorporated herein by reference.

BACKGROUND OF THE INVENTION

1. Field of the Invention

The present invention relates to a mobile communication terminal for use in cellular radio communication systems.

2. Description of the Related Art

In recent years, a cellular radio communication system has spread. In the cellular radio communication system, a plurality of base stations are scattered and disposed in a service area, and these base stations form radio zones referred to as cells. Moreover, the base station is connected to a mobile communication terminal via a radio channel for each cell. In this type of system, when a power supply is turned on in the mobile communication terminal, synchronization is established between the mobile communication terminal and closest base station. Moreover, after the synchronization is established, the system shifts to a standby state.

The mobile communication terminal performs an intermittent reception operation in the standby state. The intermittent reception operation comprises: alternately setting a wake-up period and sleep period in a constant standby period, so that power consumption of the mobile communication terminal is reduced.

A preparation operation for wake-up, path search operation, and reception operation of a paging channel are successively performed in the wake-up period. In an example of a wideband code division multiple access (W-CDMA) (IMT-2000: 3GPP specification), a wake-up starting process, identification process of a reception timing, and reception of a paging indicator channel (PICH) are successively performed.

In the path search, a path search window is set based on a path timing detected in the previous wake-up period. Subsequently, a path of a pilot channel coming from the base station on standby (hereinafter referred to as an active base station) is detected in the path search window, and a reception timing is identified with respect to the detected path. The reception of the paging channel comprises: receiving PICH transmitted from the active base station following the identified reception timing; and detecting an incoming message addressed to own terminal. As a result of the reception of the PICH, when the incoming message addressed to the own terminal is detected, the reception operation is continuously performed for incoming control. On the other hand, when the incoming message addressed to the own terminal is not detected, the system shifts to the sleep period.

Additionally, in this type of mobile communication terminal, a reception frequency of a receiver needs to be matched with a transmission frequency of the base station in order to demodulate an information symbol, and an automatic frequency control function (AFC) is disposed for that. The AFC detects a phase rotation direction and rotation amount of the symbol, for example, with respect to the path of a pilot channel detected in the path search. Subsequently, the reception frequency of the receiver is corrected in a direction in which the rotation of the phase is stopped. When the AFC is performed, fluctuation of the reception frequency of the mobile communication terminal can be corrected, and thereby stability of a reception demodulation process is enhanced (e.g., see Jpn. Pat. Appln. KOKAI Publication No. 2002-217776).

However, the related-art AFC corrects the frequency based on the reception result of the path of the pilot channel detected by the path search as described above. Therefore, when the phase of the reception timing of the path coming from the active base station shifts, for example, by a temperature fluctuation of local oscillation frequency of the mobile communication terminal during the sleep period, the path for use in the AFC is not found, and the frequency cannot be corrected. Moreover, a reception quality of the path coming from the active base station is deteriorated by a change of radio propagation environment. Also when the AFC performs an erroneous operation by the influence, the path for use in the AFC cannot be found, and the frequency cannot be corrected in some case. When the frequency cannot be corrected, a probability of failure in the path search becomes remarkably high in the subsequent wake-up period.

In general, when the path search continuously fails in a predetermined number of (e.g., three) wake-up periods in the standby state in the mobile communication terminal, "out of service area" is determined. That is, the out of service area is determined, although it is not the out of service area in actual. Therefore, an opportunity in which a user cannot perform communication increases, and service is unfavorably deteriorated. Moreover, when "the out of service area" is determined, the mobile communication terminal is returned to the same initial capture operation as that at a power-on time. Therefore, an unnecessary power is consumed for the initial capture operation, the power consumption of the mobile communication terminal increases the more, and battery life is reduced.

BRIEF SUMMARY OF THE INVENTION

The present invention has been developed in consideration of the above-described circumstances, and an object thereof is to provide a mobile communication terminal in which the out of service area is not instantly determined with a frequency not corrected in path search and in which service is thereby improved with respect to a user and power consumption is reduced.

To achieve the object, according to the present invention, first search means which is path search means detects a path of a radio signal transmitted from a first base station on standby in a wake-up period in a standby state, and second search means which is cell search means detects the path of the radio signal transmitted from the first base station and a second base station existing in the periphery of the first base station, when the path from the first base station is not detected. Moreover, when the first search means detects the path, an error of a reception frequency is detected based on a reception signal of the path. On the other hand, when the first search means does not detect the path, the error of the reception frequency is detected based on the reception signal of the path detected by the second search means. Moreover, the reception frequency of a receiver is constituted to be controlled so as to decrease the detected frequency error.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A and 4B are timing charts showing one example of phase deviation by an AFC erroneous operation;

FIGS. 5A and 5B are timing charts showing a detection operation of a path in a case in which the phase deviation is generated; and FIGS. 6A and 6B are timing charts showing the detection operation of the path in a case in which the phase deviation and deterioration of reception quality are generated.

DETAILED DESCRIPTION OF THE INVENTION

Figure 1:
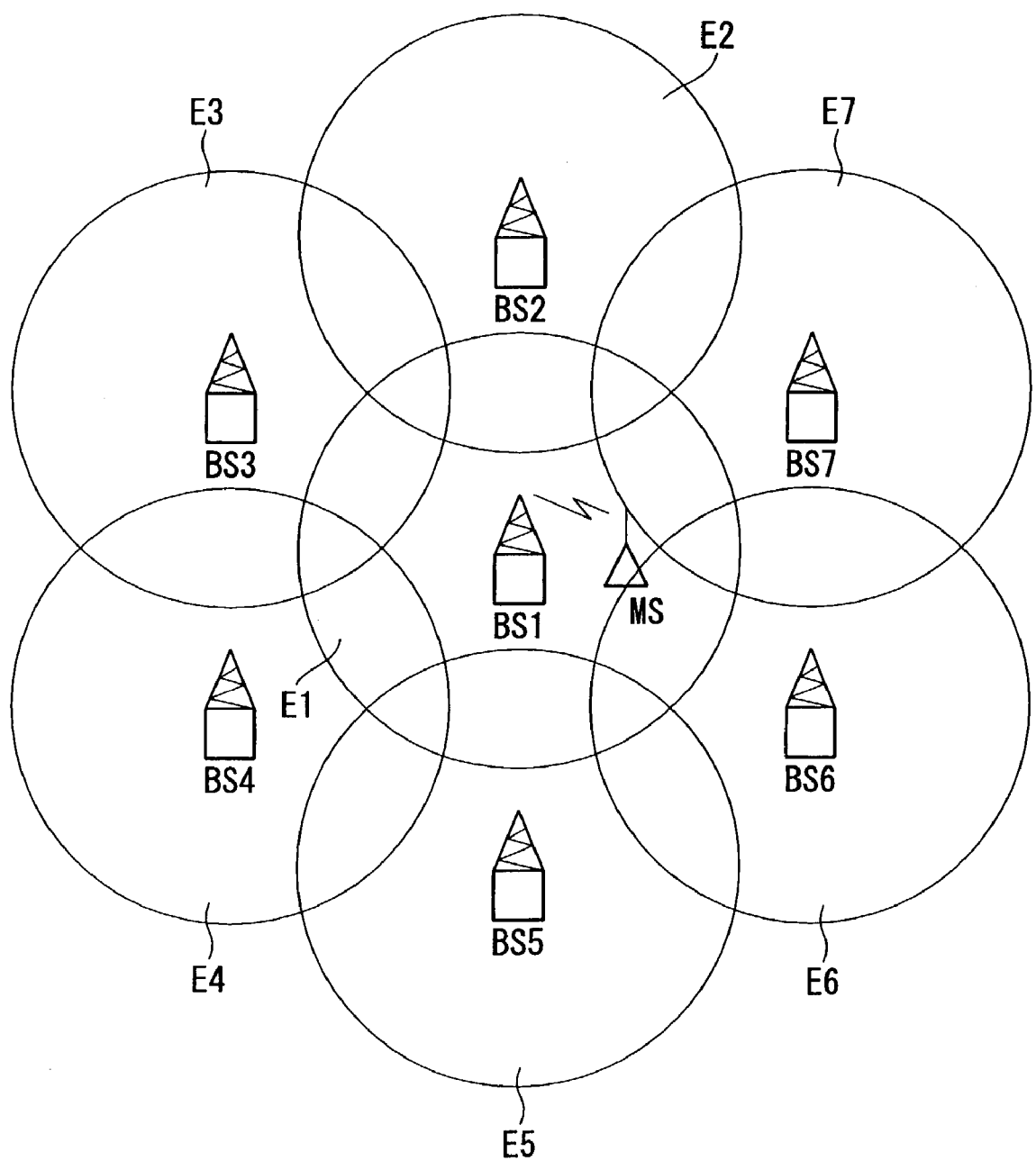
FIG. 1 is a schematic constitution diagram of a mobile communication system according to one embodiment of the present invention.

FIG. 1 is a schematic constitution diagram of a mobile communication system according to the present invention.

A plurality of base stations BS1 to BS7 are scattered/disposed in a service area. These base stations BS1 to BS7 form radio zones E1 to E7 referred to as cells. Synchronization is established between a mobile communication terminal MS and any of the base stations BS1 to BS7 in the radio zones E1 to E7. After the establishment of the synchronization, a state shifts to a standby state. It is to be noted that, for example, a wideband code division multiple access (W-CDMA) method is used in a radio access method between the base stations BS1 to BS7 and mobile communication terminal MS.

Figure 2:
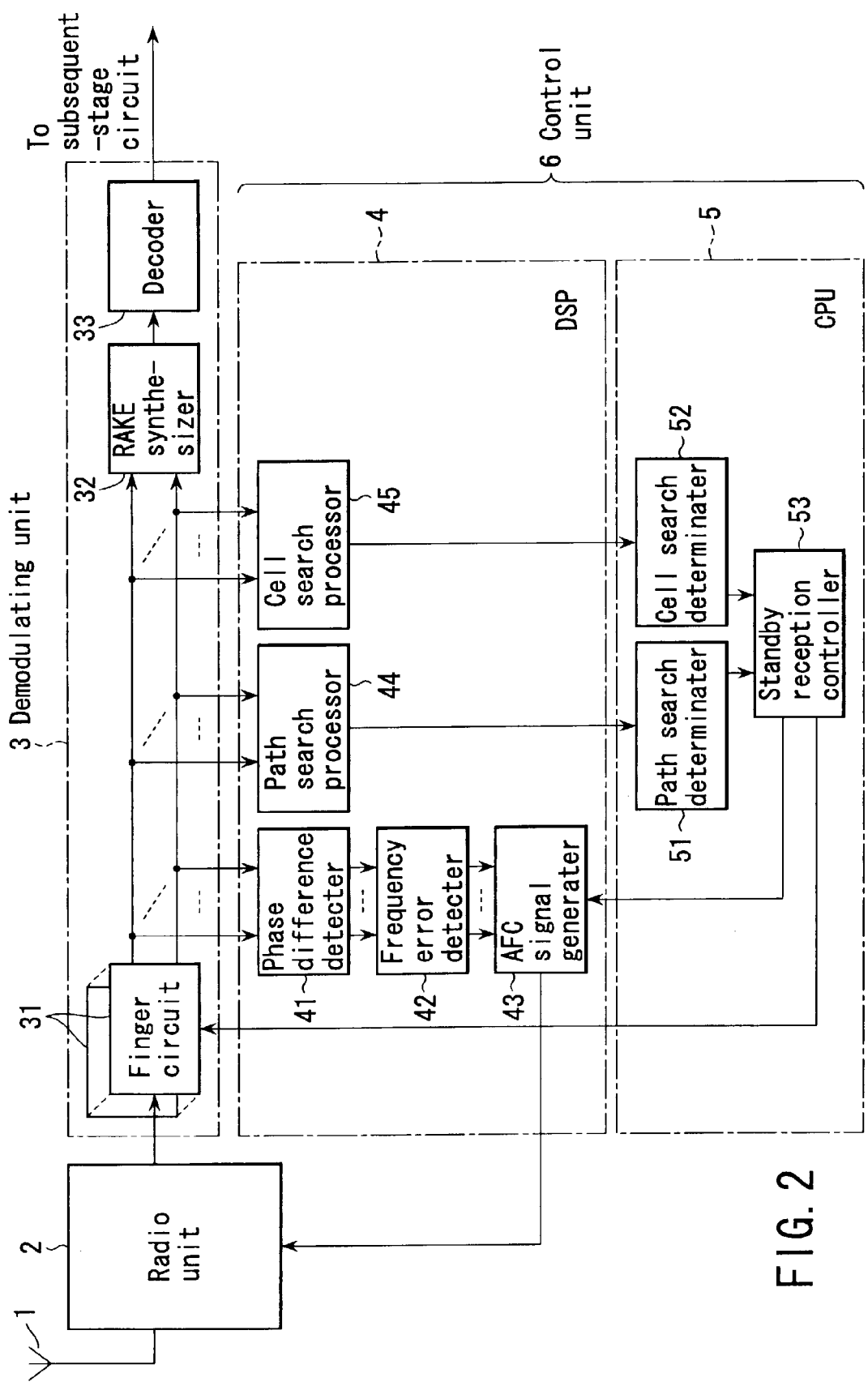
FIG. 2 is a function block diagram showing a main part constitution of a mobile communication terminal according to one embodiment of the present invention.

FIG. 2 is a block diagram showing a constitution of a part of the mobile communication terminal MS according to the present invention.

In FIG. 2, radio signals transmitted from the base stations BS1 to BS7 are received by an antenna 1 and inputted into a radio unit 2. The radio unit 2 includes a low noise amplifier, frequency converter, and orthogonal demodulator. The low noise amplifier amplifies the received radio signal to a level necessary for frequency conversion and orthogonal demodulation. The frequency converter includes a mixer, and a local oscillator in which a frequency synthesizer is used. Moreover, the radio signal outputted from the low noise amplifier is mixed with a reception local oscillation signal generated from the local oscillator by the mixer, and converted in frequency to an intermediate frequency signal. The orthogonal demodulator orthogonally demodulates the reception intermediate frequency signal outputted from the frequency converter to output a reception base band signal. The reception base band signal is converted to a digital signal by an analog/digital (A/D) converter (not shown), and substantially inputted into a demodulation unit 3.

The demodulation unit 3 includes a plurality of finger circuits 31, RAKE synthesizer 32, and decoder 33. The reception base band signal includes a plurality of paths received via different radio transmission paths, and the finger circuits 31 inversely diffuse these paths by diffusion codes. The RAKE synthesizer 32 allows the demodulation signals of the respective paths outputted from the respective finger circuits 31 to agree with one another in the phase and synthesizes symbols. The decoder 33 corrects an error and decodes the demodulation signal outputted from the RAKE synthesizer 32. The demodulation signal whose error is corrected and which is decoded is supplied to a subsequent-stage circuit (not shown) including a speech decoder and video decoder.

Moreover, the mobile communication terminal MS includes a digital signal processing unit (DSP) 4 and central processing unit (CPU) 5. These DSP 4 and CPU 5 constitute a control unit 6 and execute a predetermined process following a control program.

The DSP 4 includes a phase difference detector 41, frequency error detector 42, and AFC signal generator 43 in order to realize an automatic frequency control (AFC) function. The phase difference detector 41 detects a phase difference vector between the symbols from the demodulation signals of the respective paths outputted from the finger circuits 31 of the demodulation unit 3.

The frequency error detector 42 obtains a phase rotation amount of each path based on the angle of the phase difference vector obtained in the phase difference detector 41 and time difference between average vectors. Moreover, the obtained phase rotation amount of each path is converted to a frequency, and the converted frequency is regarded as a frequency error of each path.

The AFC signal generator 43 applies, for example, predetermined weights to the frequency errors of the respective paths detected by the frequency error detector 42, and synthesizes and averages the errors. Moreover, an AFC signal is generated to decrease the obtained frequency error. The generated AFC signal is supplied to a frequency synthesizer of the radio unit 2.

Furthermore, the DSP 4 includes a path search processor 44 and cell search processor 45. The path search processor 44 detects reception qualities of the respective demodulation signals of the paths outputted from the finger circuits 31 of the demodulation unit 3 in a path search period in which the active base station is regarded as a search object.

The cell search processor 45 detects the reception qualities of the respective demodulation signals of the paths outputted from the finger circuits 31 of the demodulation unit 3 in a cell search period in which the active base station and peripheral base station are regarded as the search objects. It is to be noted that the reception quality can be detected, frequency error, as a ratio (Ec/No) of the signal to a noise in both the path search and cell search.

The CPU 5 includes a path search determiner 51, cell search determiner 52, and reception controller 53. The path search determiner 51 determines presence/absence of a path which can be used in identifying the reception timing based on the reception quality of each path detected in the path search processor 44 of the DSP 4, and selects the path having the best reception quality from a plurality of paths satisfying the condition if any.

The cell search determiner 52 compares the reception quality of each path detected in the cell search processor 45 of the DSP 4 with a predetermined condition, and thereby detects the path which can be used in correcting the frequency. Moreover, the portion selects the base station having the best reception quality of the path from the base stations in which the paths satisfying the condition are detected.

The reception controller 53 allows the finger circuit 31 to first perform the path search in which the active base station on standby is the object every wake-up period. Subsequently, it is determined based on a determination result of the path search determinater 51 whether or not the path satisfying the condition is detected in the path search. As a result of determination, when the path satisfying the condition is detected, the AFC function is allowed to correct the frequency based on the path.

On the other hand, when the path satisfying the condition is not detected, the finger circuit 31 is allowed to perform the cell search in which the active base station on standby and peripheral base station are objects. Subsequently, it is determined based on the determination result of the cell search determinater 52 whether or not the path satisfying the condition is detected in the cell search. As the result of determination, when the path satisfying the condition is detected, the base station having the best reception quality of the path is selected from the base stations to which the paths have been transmitted. Subsequently, the AFC function is allowed to correct the frequency based on the path coming from the selected base station.

Figure 3:
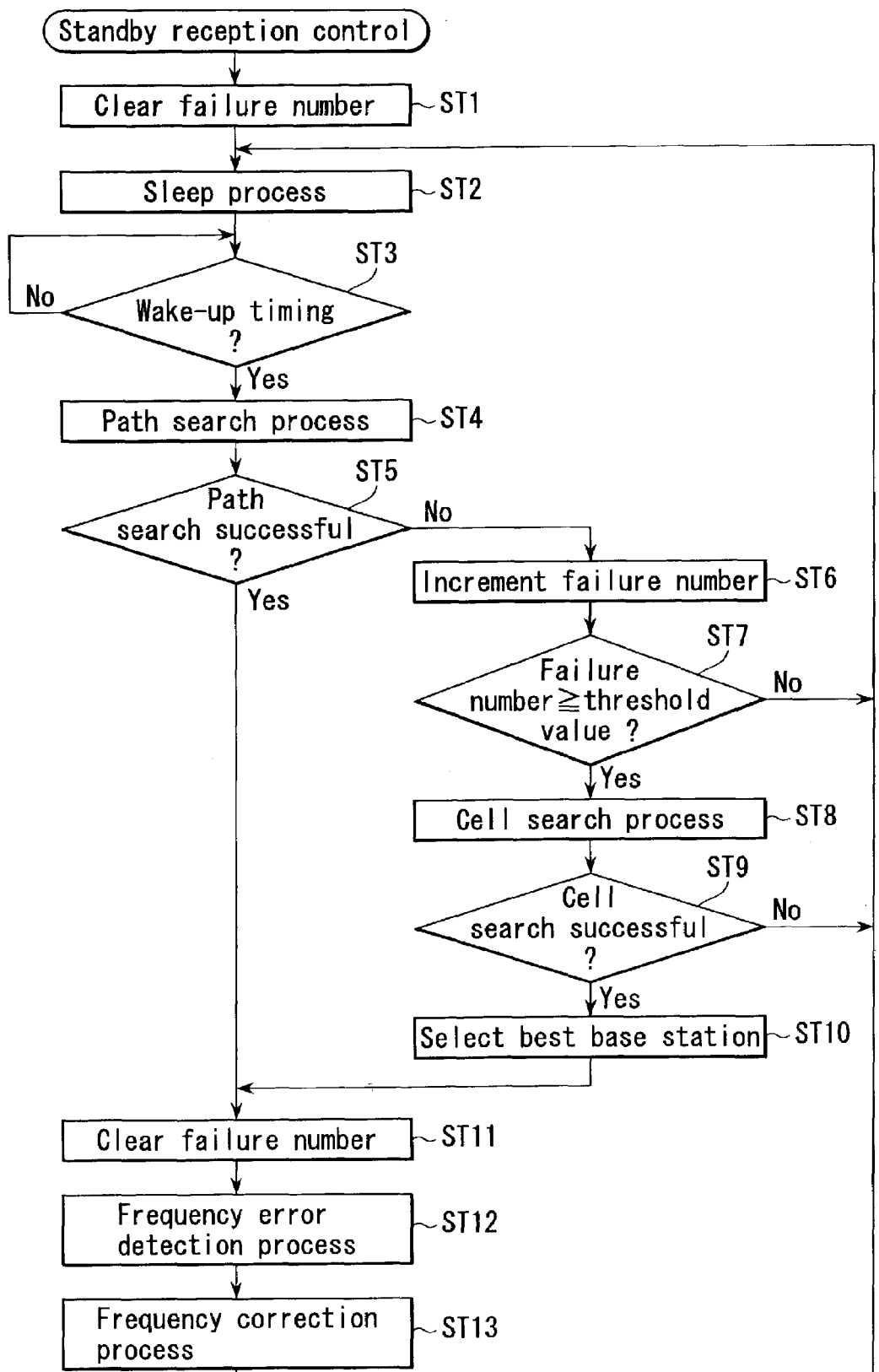
FIG. 3 is a flowchart showing a frequency control procedure and control content in a standby state of the mobile communication terminal shown in FIG. 2.

Next, a standby reception operation of the mobile communication terminal MS constituted as described above will be described. FIG. 3 is a flowchart showing a control procedure and control content by the DSP 4 and CPU 5.

The mobile communication terminal MS captures the active base station on standby in response to power-on, and subsequently shifts to a standby reception control. For example, in FIG. 1, the base station BS1 is captured as the active base station on standby, and a state shifts to a standby reception state.

On shifting to the standby reception state, the CPU 5 clears a counter of the number of failures in step ST1, and continuously executes a process to shift to a sleep state in step ST2. The failure number counter counts the number of failures in path detection in the path search described later. In the sleep shift process, for example, the stopping of power supply to the radio unit 2 and A/D converter, setting and storing of the next wake-up timing, stopping of generation of various clocks, and stopping of DSP 4 are performed in order.

In the sleep state, the CPU 5 monitors the arrival of the wake-up timing in step ST3. Subsequently, first an operation for shifting to a wake-up state is performed at the wake-up timing. In this wake-up shift operation, a circuit portion necessary for performing the reception operation is started in an operable state. The waking-up of the DSP 4, starting of various clock generation circuit, starting of power supply to the radio unit 2 and A/D converter, and initial setting of the demodulation unit 3 are performed in order.

When the wake-up shift operation ends, next the CPU 5 performs control for the path search with respect to the active base station BS1 which is the object in step ST4. In this path search, a path search window is set based on the reception timing of the path from the active base station BS1 stored in the previous wake-up period. Subsequently, the path of the pilot channel coming from the active base station BS1 is received by the finger circuit 31 in the period of this path search window. Subsequently, the reception quality of the received path is detected by the path search processor 44, and the presence/absence of the detection of the path is determined based on the detected reception quality of each path by the path search determinater 51.

When the path search ends, subsequently in step ST5 the CPU 5 determines whether or not the path search has been successful. For example, when the path satisfying the condition of the reception quality is detected in the path search window (path search range) as shown in FIG. 4A, the path search is determined to be successful. When the path search is successful, the CPU 5 clears the failure number counter in step ST11, shifts to steps ST12, ST13, and allows the DSP 4 to control the correction of the frequency.

In the DSP 4, the phase difference detector 41 detects a phase difference between the symbols by each demodulation signal of the path outputted from the finger circuit 31 of the demodulation unit 3. This detection process of the phase difference is performed as follows. That is, the symbols of the demodulation signals are divided every several symbols, and an average vector is obtained every divided several symbols. Subsequently, a phase difference vector is obtained from the phase difference between the obtained average vectors. This phase difference vector is obtained by multiplying the average vector new in time by a complex conjugate of the average vector old in time.

Next, in the DSP 4, the frequency error detector 42 obtains a phase rotation amount for each path based on the angle of the phase difference vector and time difference between the average vectors obtained in the phase difference detector 41. Subsequently, the obtained phase rotation amount of each path is converted to the frequency, and this converted frequency is the frequency error of each path.

On calculating the frequency error, the DSP 4 continuously applies, for example, the predetermined weight to the frequency error of each path detected by the frequency error detector 42, and synthesizes or averages the error by the AFC signal generater 43. Moreover, the obtained frequency error is added to a reception local oscillation frequency, and an AFC signal for generating the added reception local oscillation frequency is generated. This generated AFC signal is given to the frequency synthesizer of the radio unit 2. In this manner, the reception local oscillation frequency of the radio unit 2 is corrected.

The mobile communication terminal MS receives a paging channel (e.g., PICH in W-CDMA) after the path search and the correction of the reception frequency. Subsequently, it is determined by this paging channel whether or not the incoming message addressed to the mobile communication terminal itself has arrived. As a result of the determination, when the incoming message addressed to the mobile communication terminal itself is detected, the reception operation for controlling the incoming message is continuously performed. On the other hand, when the incoming message addressed to the mobile communication terminal itself is not included, an operation for shifting to the sleep state is executed in step ST2, and the state returns to the sleep state.

Additionally, it is assumed that the reception timing of the path coming from the active base station BS1 causes a phase shift by the temperature fluctuation of the frequency synthesizer and the erroneous operation of the AFC function in the sleep period. It is to be noted that the erroneous operation of the AFC function is generated by the deterioration of the reception quality of the path coming from the active base station BS1, for example, by the change of the radio propagation environment. When the reception timing of the path coming from the active base station BS1 causes the phase shift, for example, as shown in FIG. 4A, the reception timing of the path deviates from the path search window and cannot be detected.

To solve the problem, with the failure in the detection of the path from the active base station BS1 in the path search, the mobile communication terminal of the present embodiment standby executes the cell search without shifting to the sleep state. That is, on determining that the path search is unsuccessful in the step ST5, the CPU 5 increments the value of the failure number counter in step ST6, and then shifts to step ST7 to compare the incremented value of the failure number counter with a threshold value. Subsequently, as a result of the comparison, when the value of the failure number counter is not less than the threshold value (e.g., twice), the process shifts to step ST8 to perform a control for the cell search with respect to the active base station BS1 and peripheral base stations BS2 to BS7 which are objects.

It is to be noted that the value of the failure number counter is less than the threshold value (e.g., twice) as a result of the comparison, and then the process returns to the sleep state after ending the reception operation of the paging channel without shifting to the cell search. Thereby, it is possible to avoid a disadvantage that the cell search is executed every momentary failure of the path search by momentary disconnection of radio waves.

On shifting to the cell search, the mobile communication terminal MS first receives a synchronous channel common to the system to search the active base station BS1 and peripheral base stations BS2 to BS7. Next, the pilot channels are successively received with respect to the respective base stations found by this base station search. Subsequently, the cell search processor 45 detects the reception quality of the received pilot channel, and the cell search determinater 52 determines based on the detection result whether or not the cell search has been successful (step ST9). It is determined whether or not the cell search is successful by determining whether or not the base station including even one path satisfying the predetermined condition of the reception quality can be detected.

As a result of the determination, when the cell search is successful, the CPU 5 shifts to step ST10 to select the base station which has transmitted the path having the best reception quality. Subsequently, after clearing the count value of the failure number counter in step ST11, the CPU shifts to steps ST12, ST13 to execute frequency correction control based on the path from the selected base station.

For example, it is now assumed that, as shown in FIG. 5B, the detection of the path from the active base station BS1 is successful in the cell search, and the reception quality of the path from this active base station is best. In this case, the phase difference detector 41 detects the angle and phase rotation amount of the phase difference vector from each path from the active base station BS1. Subsequently, the frequency error detector 42 calculates the frequency error based on the angle and phase rotation amount of the detected phase difference vector. Subsequently, the reception local oscillation frequency of the frequency synthesizer is corrected in a direction in which the frequency error is decreased.

That is, the path from the active base station BS1 on standby is re-captured, and the reception frequency is corrected based on the re-captured path.

On the other hand, it is now assumed that, as shown in FIG. 6B, the detection of the path from the active base station BS1 is unsuccessful in the path search and cell search, but the detection of the path from at least one of the peripheral base stations BS2 to BS7 is successful. In this case, the angle and phase rotation amount of the phase difference vector from each path coming from the detected peripheral base station (e.g., base station BS7) are detected by the phase difference detector 41. Subsequently, the frequency error is calculated based on the detected angle and phase rotation amount of the phase difference vector by the frequency error detector 42. Subsequently, the reception local oscillation frequency of the frequency synthesizer is corrected in the direction in which the calculated frequency error is decreased.

That is, even when the frequency correction by the path from the active base station BS1 is impossible, the reception frequency can be corrected based on the path from the peripheral base station BS7.

It is to be noted that the detection of any of the active station BS1 and peripheral base stations BS2 to BS7 is assumed to be impossible as a result of the cell search. In this case, the CPU 5 returns to the step ST2 and shifts to the sleep state. Subsequently, this state in which any base station cannot be detected is continued for a predetermined number of (e.g., three) wake-up periods. Then, the CPU 5 determines the "out of service area" and shifts to the same initial capture operation as that at the power-on time.

As described above, in the present embodiment, as a result of the path search in the wake-up period, when the path from the active base station BS1 cannot be detected, the cell search is continuously performed with respect to the active base station BS1 and peripheral base stations BS2 to BS7 which are objects of the cell search. Subsequently, the base station having the best reception quality is selected from the base stations whose paths have been detected by the cell search, and the reception frequency is corrected based on the path from the selected base station.

Therefore, according to the present embodiment, for example, even when the reception timing of the path coming from the active base station causes the phase shift, for example, because of the temperature fluctuation of the reception local oscillation frequency of the frequency synthesizer, or even when the reception quality from the path coming from the active base station is deteriorated by the change of the radio propagation environment to cause the erroneous operation of the AFC function, it is possible to correct the reception frequency.

Therefore, a disadvantage that "the out of service area" is determined despite not actually being in "the out of service area" is reduced, and this can enhance the service with respect to the user. Moreover, the initial capture operation for returning the state of the out of service area again to the standby state is unnecessary. As a result, it is possible to reduce the unnecessary power consumption and to lengthen the battery life. This effect is remarkably important in the mobile communication terminal in which it is one of most important problems to reduce the power consumption of the apparatus and to further lengthen a continuous standby time.

Moreover, in the present embodiment, the base station which has transmitted the path with the best reception quality is selected from a plurality of base stations based on the detection result of the path by the cell search. Subsequently, the frequency is corrected based on the path coming from the selected base station. Therefore, since the frequency can be corrected based on the path coming from the base station having the best reception quality of the path, high-precision frequency correction can be realized.

It is to be noted that the present invention is not limited to the above-described embodiment. For example, in the above-described embodiment, the paths are detected with respect to all of the active base station BS1 and peripheral base stations BS2 to BS7 in the cell search. Subsequently, the base station which has transmitted the path having the best reception quality is selected from the respective base stations whose paths have been detected. The frequency is corrected based on the path coming from the selected base station. However, the present invention is not limited to this, and the following other various constitutions, that is, other various configurations or embodiments, are considered.

A first constitution comprises: selectively using, for example, a plurality of finger circuits 31 to perform the detection operation of the path from the active base station in parallel with the detection operation of the paths from the peripheral base stations. Subsequently, at a time at which the path satisfying the predetermined condition of the reception quality is first detected, the base station which has transmitted the path is selected, and the frequency is corrected based on the path coming from the selected base station. In this case, when the path having the predetermined reception quality or higher quality is first detected in the cell search, the frequency is corrected. Therefore, a time required until the frequency correction is completed can be shortest. Thereby, the length of the wake-up period can be set to be as short as possible, and the power consumption can further be reduced.

A second constitution comprises: first detecting the path of the radio signal transmitted from the active base station; and continuously detecting the paths of the radio signals transmitted from the peripheral base stations, when the path from the active base station is not detected. In this constitution, the path from the active base station is preferentially detected, and can be used in the frequency correction. Therefore, in cases in which the mobile communication terminal stops in the cell of the active base station with high probability such as a case in which the mobile communication terminal is stationary or is moving at a low speed, a possibility that the path for use in the frequency correction can more accurately be detected in a short time becomes high.

A third constitution comprises: first detecting the paths of the radio signals transmitted from the peripheral base stations; and continuously detecting the path of the radio signal transmitted from the active base station, when the paths from the peripheral base stations are not detected. In this constitution, the paths from the peripheral base stations are preferentially detected, and can be used in the frequency correction. Therefore, in cases in which the mobile communication terminal stops in the active cell with a low probability such as a case in which the mobile communication terminal is moving at a high speed, the possibility that the path for use in the frequency correction can more accurately be detected in the short time becomes high.

A fourth constitution comprises: determining whether the mobile communication terminal is stationary, moving at the low speed, or moving at the high speed. Subsequently, a search order of the base stations in the cell search is variable in an adapted manner based on the determination result. For example, while the mobile communication terminal is stationary or moving at the low speed, the detection of the path from the active base station is preferentially performed. On the other hand, while the mobile communication terminal is moving at the high speed, the detection of the paths from the peripheral base stations is preferentially performed. In this constitution, optimum cell search can be performed in accordance with the moving speed of the mobile communication terminal at each time.

A fifth constitution comprises: starting the process of the cell search during a period of the path search. Subsequently, when the path from the active base station is determined not to be detected by the path search, the detection process of the path by the cell search is continued. On the other hand, when the path is determined to be detected by the path search, the detection process of the path by the cell search is discontinued at this time. In this constitution, the cell search is started in parallel during the path search period. Therefore, when the path for use in the frequency correction is not found by the path search, it is possible to detect the path for use in the frequency correction in a short time by the cell search. As a result, it is possible to detect the path having a satisfactory reception quality in the short time. Moreover, it is possible to perform the high-precision frequency control by less power consumption.

A sixth constitution comprises: storing the information of the path from the base station detected every wake-up period as a path detection history. Moreover, in the cell search, the base station is searched in order from a high detection possibility based on the stored path detection history. In this case, in the cell search, the probability that the path having a good quality can be detected in the short time increases as compared with the search with respect to the base stations constantly in a fixed order.

Additionally, of course, in addition to the control procedures and contents of the path and cell searches, the procedure and content of the automatic frequency control, type and constitution of the mobile communication terminal, and type of the mobile communication system can also be modified and practiced without departing from the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A mobile communication terminal which alternately sets a wake-up period and sleep period in a standby state and which receives a radio signal transmitted from a base station in the wake-up period by a receiver, the mobile communication terminal comprising:

a path search processor configured to detect a path of the radio signal transmitted from a first base station on standby in the wake-up period;

a path search determiner configured to determine whether or not the path from the first base station has been detected by the path search processor;

a cell search section configured to detect the path of the radio signal transmitted from the first base station and a path of a radio signal transmitted from a second base station neighboring the first base station in response to a determination result of the path search determiner, if the path is not detected by the path search processor;

an error detector configured to detect an error of a reception frequency based on a reception signal of the detected path in response to the determination result of the determiner, if the path is detected by the first searcher, and to detect the error of the reception frequency based on a reception signal of the path detected by the cell search section, if the path is not detected by the first searcher; and a controller configured to control the reception frequency of the receiver so as to decrease the frequency error detected by the error detector.

2. The mobile communication terminal according to claim 1, wherein the cell search section is further configured to:

detect the path of the radio signal transmitted from the first base station;

detect the path of the radio signal transmitted from the second base station; and select the base station having a best reception quality from the first and second base stations based on detection results of the paths detected, wherein the error detector detects the error of the reception frequency based on the path transmitted from the selected base station.

3. The mobile communication terminal according to claim 1, wherein the cell search section is further configured to:

detect the path of the radio signal transmitted from the first base station;

detect the path of the radio signal transmitted from the second base station; and select the base stations whose path satisfies a predetermined condition and is first detected, from the first and second base stations based on the paths detected, wherein the error detector means detects the error of the reception frequency based on the first detected path.

4. The mobile communication terminal according to claim 1, wherein the cell search section is further configured to:

detect the path of the radio signal transmitted from the first base station on standby; and continuously detect the path of the radio signal transmitted from the second base station, if the path from the first base station is not detected.

5. The mobile communication terminal according to claim 1, wherein the cell search section is further configured to:

detect the path of the radio signal transmitted from the second base station; and continuously detect the path of the radio signal transmitted from the first base station on standby, if the path from the second base station is not detected.

6. The mobile communication terminal according to claim 1, wherein:

the cell search section starts the detection of the path during a detection period of the path by the path search processor; to continue the detection of the path in response to a determination result of the path search determinater, if the path is determined not to be detected by the path search processor; and to stop the detection of the path at a time at which the path is determined to be detected by the path search processor.

7. The mobile communication terminal according to any one of claims 1 to 6, wherein the cell search section detects the paths of the radio signals transmitted from the first base station and the second base station neighboring the first base station in response to the determination result of the path search determinater, if the path from the first base station is not detected by the path search processor over a plurality of wake-up periods.

8. The mobile communication terminal according to claim 1, wherein the cell search section includes:

a cell search processor; and a cell search determinater.

* * * * *

UNITED STATES PATENT AND TRADEMARK OFFICE
CERTIFICATE OF CORRECTION

| | | |
|---|---|---|
| PATENT NO. | : 7,050,839 B2 | Page 1 of 1 |
| APPLICATION NO. | : 10/386422 | |
| DATED | : May 23, 2006 | |
| INVENTOR(S) | : Morimoto | |

It is certified that error appears in the above-identified patent and that said Letters Patent is hereby corrected as shown below:

Claim 3, column 11, line 17, change "stations" to --station--.

Signed and Sealed this

First Day of August, 2006

JON W. DUDAS
*Director of the United States Patent and Trademark Office*